United States Patent [19]

Brewster, Jr.

[11] 4,145,864
[45] Mar. 27, 1979

[54] BATTERY POWERED LAWNMOWER

[76] Inventor: Albert H. Brewster, Jr., 2530 Cypress Ave., Oklahoma City, Okla. 73069

[21] Appl. No.: 757,137

[22] Filed: Jan. 6, 1977

[51] Int. Cl.² .................. A01D 35/20; A01D 35/26
[52] U.S. Cl. ............................ 56/10.2; 56/DIG. 15
[58] Field of Search ............... 56/10.2, 10.4, 10.5, 56/DIG. 15

[56] References Cited

U.S. PATENT DOCUMENTS

| | | | |
|---|---|---|---|
| 2,597,735 | 5/1952 | Jepson | 56/10.5 |
| 2,702,448 | 2/1955 | Smith | 56/10.5 |
| 3,111,800 | 11/1963 | Quianthy | 56/10.5 |
| 3,417,470 | 12/1968 | Damon | 56/10.5 |
| 3,425,197 | 2/1969 | Kita | 56/10.2 |
| 3,550,714 | 12/1970 | Bellinger | 56/10.2 |
| 3,581,480 | 6/1971 | O'Conner | 56/11.9 |
| 3,924,389 | 12/1975 | Kita | 56/10.2 |
| 3,944,843 | 3/1976 | Van Martins | 307/116 |
| 3,969,875 | 7/1976 | Nofel | 56/10.5 |

Primary Examiner—Russell R. Kinsey
Assistant Examiner—Paul J. Hirsch
Attorney, Agent, or Firm—Dunlap, Codding & McCarthy

[57] ABSTRACT

A motor control circuit for controlling the operation of an electric lawnmower comprising an operator sensor responsive to the bridging of first and second operator contacts mounted on the lawnmower handle to provide a motor actuate signal and a power control circuit responsive to the motor actuate signal to connect the blade motor to a power source.

6 Claims, 5 Drawing Figures

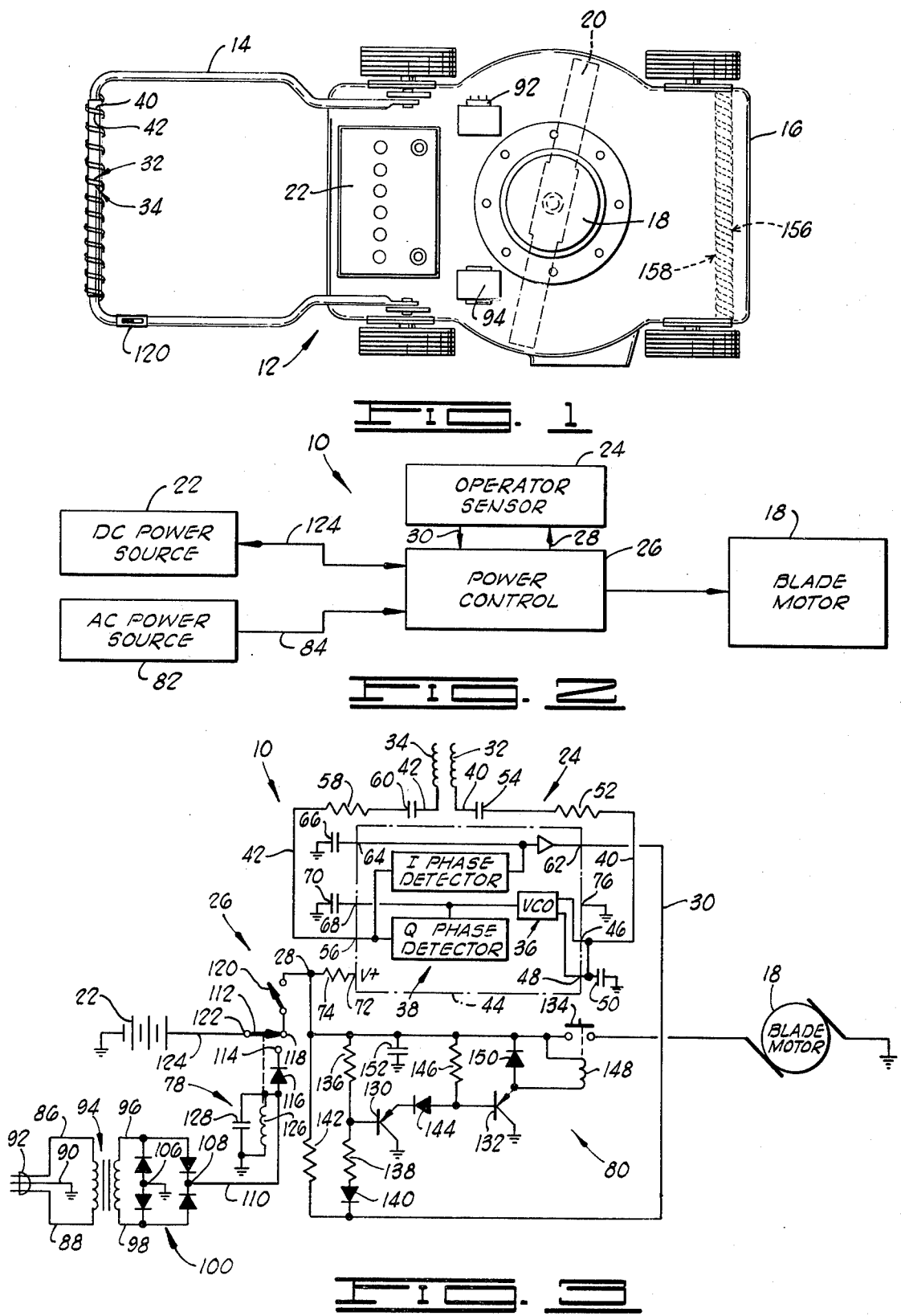

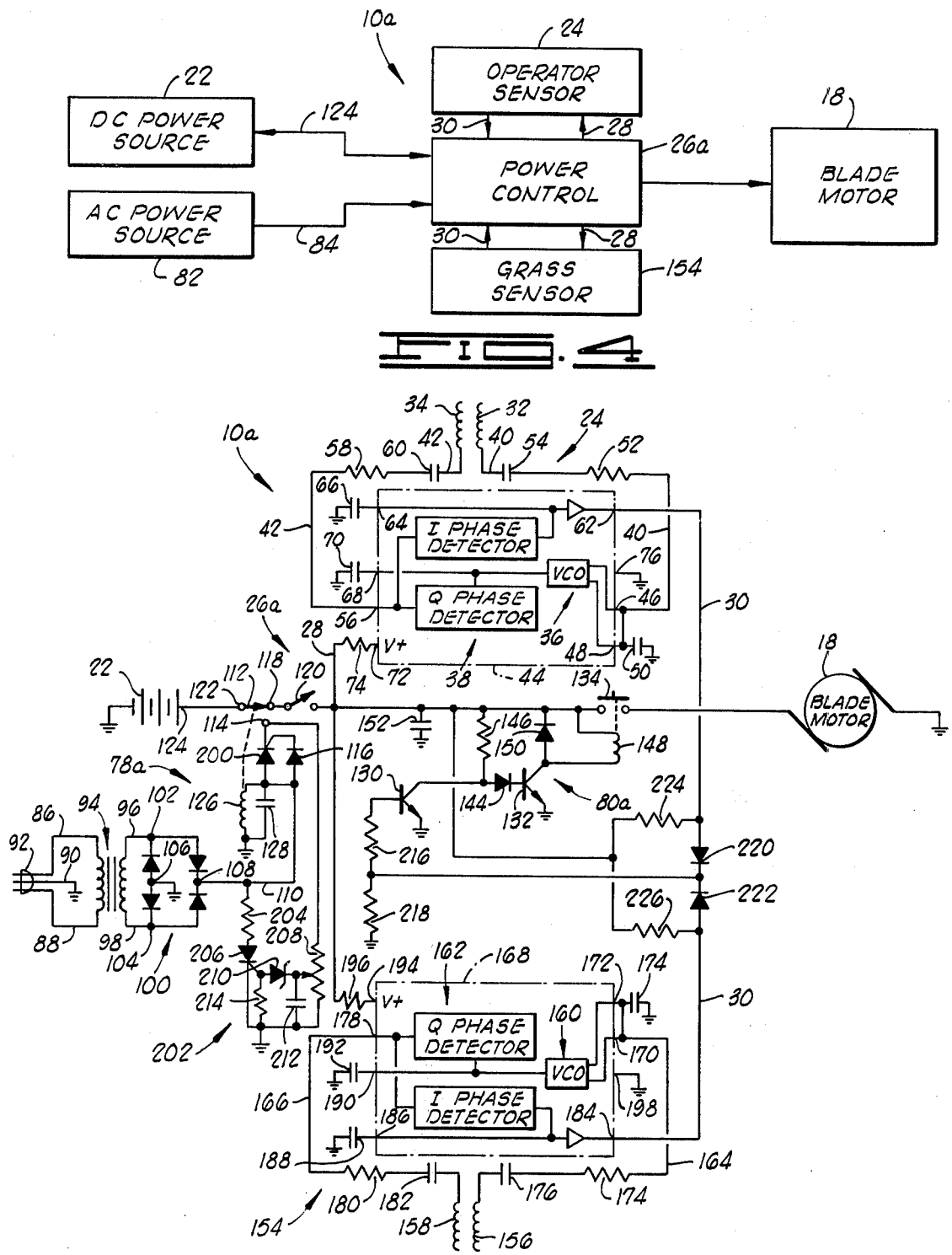

BATTERY POWERED LAWNMOWER

BACKGROUND OF THE INVENTION

1. Field of the Invention

This invention relates generally to improvements in control circuits for electric lawnmowers and, more particularly, but not by way of limitation, to a motor control circuit for controlling the operation of an electric lawnmower which is responsive to the bridging of first and second operator contacts mounted on the lawnmower handle to connect the blade motor to a power source.

2. Description of the Prior Art

In general, the motor control circuits of most electric lawnmowers consist simply of mechanical on-off switches such as that which can be seen in U.S. Pat. No. 2,909,885, issued to Smith. Other lawnmower designs provide for a plurality of mechanical apparatus for controlling additional functions such as clutch, speed, etc., as can be seen in U.S. Pat. No. 3,841,069, issued to Weck.

In the past, some electric lawnmowers have provided additional apparatus to prevent the inadvertent actuation of the lawnmower during recharging of a battery or the like, such as can be seen in U.S. Pat. No. 2,597,735, issued to Jepson. A less sophisticated mechanical interlock can be seen in U.S. Pat. No. 3,581,480, issued to O'Connor, which also incorporates a conventional "dead-man" switch on the handle. However, it has not been proposed to provide electric lawnmowers with touch responsive control circuits, one variety of which is shown in U.S. Pat. No. 3,944,843, issued to Vaz Martins.

SUMMARY OF THE INVENTION

The present invention contemplates a motor control circuit for controlling the operation of an electric lawnmower, the circuit being responsive to the bridging of first and second operator contacts mounted on the lawnmower handle to connect the blade motor to a power source.

An object of the invention is to provide a motor control circuit for controlling the operation of an electric lawnmower blade motor in response to the presence of an operator's hands on the lawnmower handle.

Another object of the invention is to provide a motor control circuit for use on a battery powered lawnmower which is responsive to the connection of the lawnmower to an external power supply for preventing the operation of the lawnmower during the recharging of the battery.

Yet another object of the invention is to provide a motor control circuit for use on a battery powered lawnmower which is reponsive to the connection of the lawnmower to an external power supply for controlling the charging of the battery in a tapering manner while preventing the inadvertent actuation of the blade motor during the recharging.

Still another object of the invention is to provide a motor control circuit for controlling the operation of an electric lawnmower for connecting the blade motor to a source of power only when the operator is gripping the handle and the vegetation to be cut extends above a predetermined grass height level.

Another object of the present invention is to provide a simple and reliable motor control circuit for controlling the operation of an electric lawnmower which is economical to manufacture and easy to maintain.

Other objects and advantages of the present invention will be evident from the following detailed description when read in conjunction with the accompanying drawings which illustrate various embodiments of the invention wherein similar parts are similarly labeled.

BRIEF DESCRIPTION OF THE DRAWINGS

FIG. 1 is a top plan view of an electric lawnmower provided with the major components of the preferred embodiment of the present invention.

FIG. 2 is a diagrammatic representation of the preferred embodiment of the present invention.

FIG. 3 is a schematic diagram of the preferred embodiment of the present invention.

FIG. 4 is a diagrammatic representation of an alternate embodiment of the present invention.

FIG. 5 is a schematic diagram of the alternate embodiment of the present invention.

DESCRIPTION OF THE PREFERRED EMBODIMENT

Refering to the drawings in general and to FIGS. 1 and 2 in particular, shown therein and referred to by the general reference number 10 is a motor control circuit constructed in accordance with the preferred embodiment of the present invention. The motor control circuit 10 is constructed for use on an electric lawnmower 12 having an operating handle 14 connected to a wheeled frame 16; a blade motor 18 mounted on the frame 16 with a cutting blade 20 disposed adjacent to the underside of the frame 16; and a power source 22, such as the battery shown in FIG. 1. The motor control circuit 10 is comprised primarily of an operator sensor 24 and a power control circuit 26 connected thereto via a pair of signal paths 28 and 30.

The operator sensor 24 is comprised primarily of a first operator contact 32 mounted on the operating handle 14; a second operator contact 34 mounted on the operating handle 14 in spaced relationship to the first operator contact 32; a signal generator 36; and a signal detector 38. In a preferred form, the first and second operator contacts 32 and 34, respectively, are formed by the end portions of a pair of insulated wire conductors 40 and 42 which are wound in parallel, spiral fashion around at least a portion of the operating handle 14 to be gripped by an operator during the operation of the lawnmower 12. After being secured to the handle 14 in an appropriate manner such as by an adhesive, the conductors 40 and 42 should have at least a portion of the insulation removed therefrom to define the contacts 32 and 34, and facilitate electrical contact with the operator's hands.

The signal generator 36 is connected to the first operator contact 32 by the conductor 40, and is constructed to apply an operator sense signal having a predetermined characteristic to the first operator contact via the conductor 40. The signal detector 38 is connected to the second operator contact 34 by the conductor 42, and is constructed to receive any signal coupled to the second operator contact 34 via the bridging of the first and second operator contacts 32 and 34, respectively, and to provide a motor actuate signal in response to receiving a signal having the predetermined characteristic.

In the preferred form shown in FIG. 3, the signal generator 36 and the signal detector 38 comprise a phase locked loop 44 of the type commercially available from the National Semiconductor Corporation of Santa Clara, California, under the designation "Tone Decoder LM567." In this form, the phase locked loop 44 has a timing capacitor terminal 46 and a timing resistor terminal 48, both of which are connected to the circuit ground via a capacitor 50 and to the first operator contact 32 via a resistor 52 interposed in the conductor 40 in series with a capacitor 54. The phase locked loop 44 has an input terminal 56 connected to the second operator contact 34 via a resistor 58 interposed in the conductor 42 in series with a capacitor 60, and an output terminal 62 connected to the power control circuit 26 via the conductor 30. In addition, the phase locked loop 44 has an output filter terminal 64 connected to the circuit ground via a capacitor 66; a loop filter terminal 68 connected to the circuit ground via a capacitor 70; a power input terminal 72 connected to the conductor 28 from the power control circuit 26 via a resistor 74; and a ground terminal 76 connected directly to the circuit ground.

The power control circuit 26 is comprised primarily of a charging circuit 78 and a power relay circuit 80. The charging circuit 78 of the power control circuit 26 may be connected to an AC power source 82 via a general signal path 84 comprised of three conductors 86, 88 and 90, terminating in a plug 92. The conductor 90 is connected to the circuit ground, while the conductors 86 and 88 are connected to the opposite ends of a primary winding of a stepdown transformer 94 which has the secondary winding thereof connected to a pair of conductors 96 and 98. A conventional full wave rectifier 100 has the input-output terminals 102 and 104 thereof connected to the conductors 96 and 98, respectively, a ground terminal 106 connected to the circuit ground, and a positive output terminal 108 connected to a conductor 110. A solenoid-actuated relay 112 has a first terminal 114 thereof connected to the conductor 110 via a diode 116, a second terminal 118 connected to the conductor 28 via an on-off switch 120, a common terminal 122 connected to the DC power source 22 via a conductor 124, with the solenoid portion 126 of the relay 112 being connected between the conductor 110 and the circuit ground in parallel with a filter capacitor 128.

The power relay circuit 80 of the power control circuit 26 is comprised primarily of a pair of PNP transistors 130 and 132, and a solenoid-actuated relay 134. The transistor 130 has the base thereof connected to the conductor 28 via a resistor 136, and to the conductor 30 via a resistor 138 connected in series with a diode 140 having the cathode thereof connected to the conductor 30. Preferrably, a biasing resistor 142 is interposed between the conductors 28 and 30 for reasons which will be made more apparent below. The transistor 130 has the collector thereof connected directly to the circuit ground and the emitter thereof connected to the base of the transistor 132 via a diode 144 having the anode thereof connected to the base of the transistor 132. The transistor 132 has the base thereof connected to the conductor 28 via a biasing resistor 146, the collector thereof connected directly to the circuit ground and the emitter thereof connected to the conductor 28 via the solenoid portion 148 of the relay 134. A shunting diode 150 is connected in parallel with the solenoid portion 148, with the anode of the diode 150 being connected to the emitter of the transistor 132. Preferably, the conductor 28 is connected to the circuit ground via a by-pass capacitor 152.

OPERATION OF THE PREFERRED EMBODIMENT

In operation, the signal generator 36 of the phase locked loop 44 will respond to the application of power thereto via the on-off switch 120, the conductor 28, and the resistor 74, by applying an operator sense signal having a predetermined frequency to the first operator contact 32 via the conductor 40 and the resistor 52 and capacitor 54 interposed therein. Thereafter, the bridging of the first and second operator contacts 32 and 34, respectively, as by the gripping of the operating handle 14 by an operator, will introduce a capacitive impedance across the contacts 32 and 34, thereby coupling at least a portion of the AC component of the operator sense signal to the signal detector 38 of the phase locked loop 44 via the conductor 42 and the resistor 56 and capacitor 60 interposed therein. The signal detector 38 will operate in a conventional manner to compare the phase of the signal being received from the second operator contact 34 with the phase of the operator sense signal being received internally from the signal generator 36.

When the phase of the signal received from the second operator contact 34 is substantially the same as the phase of the signal being received from the signal generator 36, the signal detector 38 will provide the motor actuate signal in the "low" state via the conductor 30, thereby effectively indicating that the signal detector 38 has received a signal from the second operator contact 34 having the predetermined frequency. However, if no signal is being received from the second operator contact 34 or if the phase of the signal being received from the second operator contact 34 is not sufficiently close to the phase of the operator sense signal being received from the signal generator 36, the signal detector 38 will provide the motor actuate signal in the "high" state via the conductor 30, thereby effectively indicating the absense of a signal coupled thereto via the second operator contact 34 having the predetermined frequency. In other words, the motor actuate signal applied to the conductor 30 by the signal detector 38 will be in the "high" state except when the operator is gripping the operating handle 14.

Simultaneously with the closing of the on-off switch 120, the transistor 130 will be biased in the "off" condition via the resistor 136 since the diode 140 is reverse biased via the resistor 142 in view of the "high" state of the motor actuate signal being applied to the conductor 30 by the signal detector 38. The transistor 132 will be similarly biased in the "off" condition via the resistor 146 so that the relay 134 is open and no power is applied to the blade motor 18.

Upon production of the motor actuate signal in the "low" state in response to the gripping of the operating handle 14, the diode 140 will be forward biased thereby turning "on" transistor 130. In response to the resulting current flow through the transistor 130 via the diode 144, the transistor 132 will be turned "on" thereby allowing current flow through the solenoid portion 148 of the relay 134 to close the relay 134 and apply power to the blade motor 18.

Upon production of the motor actuate signal in the "high" state in response to the release of the operating handle 14 by the operator, the diode 140 will again be reverse biased thereby successively turning "off" transistors 130 and 132. With the transistor 132 "off", current flow through the solenoid portion 148 of the relay 134 will terminate, thereby opening the relay 134 and interrupting the application of power to the blade motor 18. The reverse current surge resulting from the collapse of the magnetic field in the solenoid portion 148 upon termination of current flow therethrough is prevented from destroying the transistor 132 through the shunting effect of the diode 150. The capacitor 152 is preferably provided to prevent the motor control circuit 10 from developing any regenerative oscillations and to bypass any noise derived from the signal generator 36 to the circuit ground.

When the motor control circuit 10 is connected to the AC power source 82 via the plug 92, the transformer 94 will cooperate with the rectifier 100 and the capacitor 128 in a conventional manner to apply a rectified, filtered 12 volt AC signal to the first terminal 114 of the relay 112 via the conductor 110 and the diode 116. Simultaneously, a portion of the signal applied to the conductor 110 will flow through the solenoid portion 126 of the relay 112 to actuate the relay 112 and connect the first terminal 114 thereof to the common terminal 122 thereof, thereby facilitating recharging of the DC power source 22 by the AC power source 82. Since the second terminal 118 of the relay 112 is automatically disconnected from the DC power source 22 upon the connection of the motor circuit 10 to the AC power source 82, inadvertant operation of the blade motor 18 during the recharging of the DC power source 22 is prevented. However, as soon as the motor control circuit 10 is disconnected from the AC power source 82, current flow through the solenoid portion 126 of the relay 112 will cease, thereby reconnecting the common terminal 122 of the relay 112 to the second terminal 118 thereof so that the power is once again available for application to the operator sensor 24 and the power relay circuit 80.

DESCRIPTION OF THE ALTERNATE EMBODIMENT

Referring to FIGS. 4 and 5, shown therein and referred to by the general reference number 10a is a modified motor control circuit constructed substantially the same as the motor control circuit 10 shown in FIGS. 2 and 3, except that the motor control circuit 10a includes a grass sensor 154 and a modified power control circuit 26a connected to the grass sensor 154 via the signal paths 28 and 30.

The grass sensor 154 is comprised primarily of a first grass contact 156 disposed adjacent to the underside of the frame 16; a second grass contact 158 disposed adjacent to the underside of the frame 16 in a spaced relationship to the first grass contact 156; a signal generator 160; and a signal detector 162. In a preferred form, the first and second grass contacts 156 and 158, respectively, are formed by the end portions of a pair of insulated wire conductors 164 and 166 which are wound in parallel, spiral fashion around a supporting strip of plastic or the like (not shown) connected to the underside of the frame 16 at substantially the same height as the blade 20. After being secured to the supporting strip in an appropriate manner such as by an adhesive and connected to the frame 16 by conventional means, the conductors 164 and 166 should have at least a portion of the insulation removed therefrom to define the contacts 156 and 158, and to facilitate electrical contact with vegetation extending upwardly from the ground surface on which the frame 16 is supported into physical contact with the contacts 156 and 158. Of course, the contacts 156 and 158 may be connected to the frame 16 at some other desired height relative to the ground surface to establish a predetermined grass height level.

The signal generator 160 is constructed substantially the same as the signal generator 36, except that the signal generator 160 is connected to the first grass contact 156 via the conductor 164, and is constructed to apply a grass sense signal having a predetermined characteristic to the first grass contact 156 via the conductor 164. The signal detector 162 is constructed substantially the same as the signal detector 38, except that the signal detector 162 is connected to the second grass contact 158 via the conductor 166, and is constructed to receive any signal coupled to the second grass contact 158 via the bridging of the first and the second grass contacts 156 and 158, respectively, and to provide a motor actuate signal in response to receiving a signal having the predetermined characteristic.

In the preferred form shown in FIG. 5, the signal generator 160 and the signal detector 162 comprise a phase locked loop 168 of the type commercially available from the National Semiconductor Corporation of Santa Clara, California, under the designation "TONE DECODER LM567." In this form, the phase locked loop 168 has a timing capacitor terminal 170 and a timing resistor terminal 172, both of which are connected to the circuit ground via a capacitor 174 and to the first grass contact 156 via a resistor 174 connected in series with a capacitor 176. The phase locked loop 168 has an input terminal 178 connected to the second grass contact 156 via a resistor 180 connected in series with a capacitor 182, and an output terminal 184 connected to the power control circuit 26a via the conductor 30. In addition, the phase locked loop 168 has an output filter terminal 186 connected to the circuit ground via a capacitor 188; a loop input terminal 190 connected to the circuit ground via a capacitor 192; a power input terminal 194 connected to the conductor 28 from the power control circuit 26a via a resistor 196; and a ground terminal 198 connected directly to the circuit ground.

The power control circuit 26a is comprised primarily of a charging circuit 78a and a power relay circuit 80a. The charging circuit 78a of the power control circuit 26a is constructed substantially the same as the charging circuit 78 of the power control circuit 26, except that the charging circuit 78a has an SCR 200 connecting the conductor 110 to the first terminal 114 of the relay 112, and includes a rate control portion 202. The rate control portion 202 is comprised of the diode 116 having the anode thereof connected to the conductor 110 and the cathode thereof connected to the gate of the SCR 200; a resistor 204 connected in series with an SCR 206 between the conductor 110 and the circuit ground; a potentiometer 208 connecting the first terminal 114 of the relay 112 to the circuit ground; a zener diode 210 having the anode thereof connected to the gate of the SCR 206 and the cathode thereof connected to the wiper of the potentiometer 208; a capacitor 212 interposed between the cathode of the zener diode 210 and the circuit ground; and a resistor 214 interposed between the anode of the zener diode 210 and the circuit ground.

The power relay circuit 80a of the power control circuit 26a, is constructed substantially the same as the power relay circuit 80 of the power control circuit 26, except that each of the transistors 130 and 132 are of the NPN type; the diode 144 is interposed between the resistor 146 and the base of the transistor 132; and the base of the transistor 130 is not connected in any way to the conductor 28, but instead connected to the circuit ground by a pair of resistors 216 and 218. In addition, the signal detectors 38 and 162 have the output terminals 62 and 184 thereof connected to the junction between the resistors 216 and 218 via diodes 220 and 222, respectively; and to the conductor 28 from the power control circuit 26a via resistors 224 and 226, respectively.

OPERATION OF THE ALTERNATE EMBODIMENT

In operation, the signal generator 160 of the phase locked loop 168 will respond to the application of power thereto via the on-off switch 120, the conductor 28, and the resistor 196, by applying a grass sense signal having a predetermined frequency to the first grass contact 156 via the conductor 164 and the resistor 174 and the capacitor 176 interposed therein. Thereafter, the bridging of the first and second grass contacts 156 and 158, respectively, as by physical contact with vegetation extending upwardly from the ground surface on which the frame 16 is supported, will introduce a capacitive impedance across the contacts 156 and 158, thereby coupling at least a portion of the AC component of the grass sense signal to the signal detector 162 of the phase locked loop 168 via the conductor 166 and the resistor 180 and capacitor 182 interposed therein. The signal detector 162 will operate in a conventional manner to compare the phase of the signal being received from the second grass contact 158 with the phase of the grass sense signal being received internally from the signal generator 160.

When the phase of the signal received from the second grass contact 158 is substantially the same as the phase of the signal being received from the signal generator 160, the signal detector 162 will provide the motor actuate signal in the "low" state via the conductor 30, thereby effectively indicating that the signal detector 162 has received a signal from the second grass contact 158 having the predetermined frequency. However, if no signal is being received from the second grass contact 158 or if the phase of the signal being received from the second grass contact 158 is not sufficiently close to the phase of the grass sense signal being received from the signal generator 160, the signal detector 162 will provide the motor actuate signal in the "high" state via the conductor 30, thereby effectively indicating the absence of the signal coupled thereto via the second grass 158 contact having the predetermined frequency. In other words, the motor actuate signal applied to the conductor 30 by the signal detector 162 will be in the "high" state except when the vegetation is sufficiently tall to contact the first and second grass contacts 156 and 158, respectively.

Simultaneously with the closing of the on-off switch 120, the transistor 130 will be biased in the "on" condition by the "high" states of the first and second motor actuate signals being applied thereto by the signal detectors 38 and 162, respectively, through diodes 220 and 222 and the resistor 216. The transistor 132 will thereby be biased in the "off" condition so that the relay 134 is open and no power is applied to the blade motor 18.

As will be clear to those skilled in the art, the connection of the signal detectors 38 and 162 to the transistor 130 via the diodes 220 and 222, respectively, effectively forms a logical AND gate so that the transistor 130 will remain in the "on" condition until both the first and the second motor actuate signals are in the "low" state. In other words, the transistor 130 will be biased in the "off" condition only when the operator is gripping the operating handle to induce the production of the first motor actuate signal in the "low" state via the signal detector 38, simultaneously with the presence of vegetation in excess of the predetermined grass height beneath the frame 16 resulting in the production of the second motor actuate signal in the "low" state via the signal detector 162. In response to the absense of current flow through the transistor 130 in the "off" condition thereof, the transistor 132 will be turned "on" thereby allowing current flow through the solenoid portion 148 of the relay 134 to close the relay 134 and apply power to the blade motor 18. Upon production of either the first motor actuate signal in the "high" state in response to the release of the operating handle 14 by the operator or the second motor actuate signal in the "high" state in response to the absence of vegetation in excess of the predetermined grass height beneath the frame 16, the transistors 130 and 132 will be successively biased in the "on" and "off" conditions, respectively. With transistor 132 "off," current flow through the solenoid portion 148 of the relay 134 will terminate, thereby opening the relay 134 and interrupting the application of power to the blade motor 18. Thus, the mower 12 may be moved across an area to be mowed by an operator gripping the handle 14 but the blade motor 18 will have power applied thereto only when the vegetation beneath the frame 16 is of sufficient height to warrant the cutting thereof.

As described generally above, the reverse current surge resulting from the collapse of the magnetic field in the solenoid portion 148 upon termination of current flow therethrough is prevented from destroying the transistor 132 through the shunting effect of the diode 150. Again, the capacitor 152 is preferably provided to prevent the motor control circuit 10a from developing any regenerative oscillations and to bypass any noise derived from the signal generators 36 and 160 to the circuit ground.

When the motor control circuit 10a is connected to the AC power source 82 via the plug 92, the transformer 94 will cooperate with the rectifier 100 and the capacitor 128 in a conventional manner to apply a rectified filtered 12 volt AC signal to the first terminal 114 of the relay 112 via the conductor 110 and the SCR 200, the SCR 200 having been turned "on" via the diode 116. Simultaneously, a portion of the signal applied to the conductor 110 will flow through the solenoid portion 126 of the relay 112 to actuate the relay 112 and connect the first terminal 114 thereof to the common terminal 122 thereof, thereby facilitating recharging of the DC power source 22 by the AC power source 82. The rate control portion 202 of the charging circuit 78a will operate in a conventional, well-known manner to decrease the rate at which the DC power source 22 charges as the DC power source 22 approaches the fully charged condition. Since the second terminal 118 of the relay 112 is automatically disconnected from the DC power source 22 upon the connection of the motor control circuit 10a to the AC power source 82, inadvertent operation of the blade motor 18 during the recharging of the DC power source 22 is prevented. However, as soon as the motor control circuit 10a is disconnected from the AC power source 22, current flow through the solenoid portion 126 of the relay 112 will cease, thereby reconnecting the common terminal 122 of the relay 112 to the second terminal 118 thereof so that power is once again available for application to the operator sensor 24, the grass sensor 154, and the power relay circuit 26a.

Changes may be made in the construction and the arrangement of the parts or the elements of the various embodiments as disclosed herein without departing from the spirit and scope of the invention as defined in the following claims.

What is claimed is:

1. A circuit for controlling an electric lawnmower having an operating handle, a blade motor and a power source, the circuit comprising:

an operator sensor comprising:
   a first operator contact mounted on the operating handle;
   a second operator contact mounted on the operating handle in spaced relationship to the first operator contact, the first and second operator contacts being bridgeable via a human hand;
   signal generating means connected to the first operator contact, the signal generating means applying an operator sense signal having a predetermined frequency to the first operator contact; and,
   signal detecting means connected to the second operator contact, the signal detecting means receiving any signal coupled to the second operator contact via the bridging of the first and second operator contacts, and providing a motor actuate signal in response to receiving a signal having the predetermined frequency; and,
power relay means connected to the power source, the blade motor and the signal detecting means, the power relay means receiving the motor actuate signal and connecting the power source to the blade motor in response to the received motor actuate signal.

2. The circuit of claim 1 wherein the signal generating means and the signal detecting means are further characterized as comprising a phase locked loop.

3. The circuit of claim 1 wherein the power source includes a DC power source mounted on the lawnmower and an AC power source connectable to the lawnmower, the circuit further including:

charging means having a first portion connected to the AC power source for providing a rectified, filtered AC signal, and a second portion connected to the DC power source for connecting the rectified, filtered AC signal to the DC power source while simultaneously disconnecting the DC power source from the power relay means.

4. The circuit of claim 3 wherein the charging means is further defined to include a rate control portion for decreasing the rate at which the rectified, filtered AC signal is applied to the DC power source as the DC power source approaches the fully charged condition.

5. The circuit of claim 1 further defined to include a grass sensor comprising:

a first grass contact mounted on the underside of the lawnmower at a predetermined grass height level;
a second grass contact mounted on the underside of the lawnmower in spaced relationship to the first grass contact, the first and second grass contacts being bridgeable via vegetation extending upwardly from the ground surface on which the lawnmower is supported;
signal generating means connected to the first grass contact, the signal generating means applying a grass sense signal having a predetermined frequency to the first grass contact; and
signal detecting means connected to the second grass contact, the signal detecting means receiving any signal coupled to the second grass contact via the bridging of the first and second grass contacts, and providing a motor actuate signal in response to receiving a signal having the predetermined frequency; and wherein the power relay means is further characterized as being connected to the signal detecting means of the grass sensor as well as the signal detecting means of the operator sensor, the power relay means receiving the motor actuate signal provided by the signal detecting means of the operator sensor and the motor actuate signal provided by the signal detecting means of the grass sensor, and connecting the power source to the blade motor in response to receiving both of said motor actuate signals.

6. The circuit of claim 5 wherein the signal generating means and the signal detecting means of the grass sensor are further characterized as comprising a phase locked loop.

* * * * *